United States Patent [19]

Althaus et al.

[11] Patent Number: 4,741,796

[45] Date of Patent: May 3, 1988

[54] METHOD FOR POSITIONING AND BONDING A SOLID BODY TO A SUPPORT BASE

[75] Inventors: Hans Althaus, Lappersdorf; Werner Kuhlmann, Munich; Werner Spaeth, Holzkirchen, all of Fed. Rep. of Germany

[73] Assignee: Siemens Aktiengesellschaft, Berlin and Munich, Fed. Rep. of Germany

[21] Appl. No.: 855,275

[22] Filed: Apr. 24, 1986

[30] Foreign Application Priority Data

May 29, 1985 [DE] Fed. Rep. of Germany ....... 3519260

[51] Int. Cl.$^4$ .............. B29C 65/02; B29C 65/04; B29C 65/14; B29C 65/18
[52] U.S. Cl. .............. 156/272.4; 156/273.5; 156/273.7; 156/273.9; 156/274.4; 156/274.8; 156/275.5; 156/275.7; 156/293; 156/297; 156/320; 156/322; 228/127; 350/96.17; 350/96.2
[58] Field of Search ............ 350/96.17, 96.2; 156/145, 158, 272.2, 272.4, 272.8, 303.1, 273.3, 273.5, 273.9, 305, 274.4, 273.7, 274.8, 297, 275.5, 275.7, 293–294, 307.1, 308.2, 308.4, 320, 310–311, 322; 228/127, 212; 219/10.53, 10.77, 10.79, 78.01, 85 M, 85 BM

[56] References Cited

U.S. PATENT DOCUMENTS

| | | | |
|---|---|---|---|
| 2,388,242 | 11/1945 | Arndt | 156/273.9 |
| 3,397,278 | 8/1968 | Pomerantz | 156/273.9 |
| 4,119,363 | 10/1978 | Camlibel | 350/96.2 |
| 4,303,304 | 12/1981 | Ruiz | 350/96.2 |
| 4,357,072 | 11/1982 | Goodfellow | 350/96.2 |
| 4,382,113 | 5/1983 | Schwartz | 156/275.7 |
| 4,479,698 | 10/1984 | Landis | 350/96.17 |

FOREIGN PATENT DOCUMENTS 2128768 5/1984 United Kingdom .
2146841 4/1985 United Kingdom .

Primary Examiner—Merrell C. Cashion, Jr.
Attorney, Agent, or Firm—James G. Morrow

[57] ABSTRACT

A method and arrangement for the positioning and bonding of a solid body (2), in which one part of the solid body (2) together with the bonding agent (6) is to be attached to a further element (7) and bonded to a base (4) is to be capable of positioning the solid body (2), at the point attained from positioning, with both high precision and high long term stability. The solid body (2) is immersed in the bonding agent (6) and this bonding agent is in turn located in a groove of a further electrically conducting body (7). The further body (7) is heated by current flow to a temperature at which the solid body (2) is movable within the bonding agent. Upon attaining the desired positioning of the solid body (2), the bonding agent is allowed to cool through controlled reduction of the heating current until solidification occurs.

24 Claims, 2 Drawing Sheets

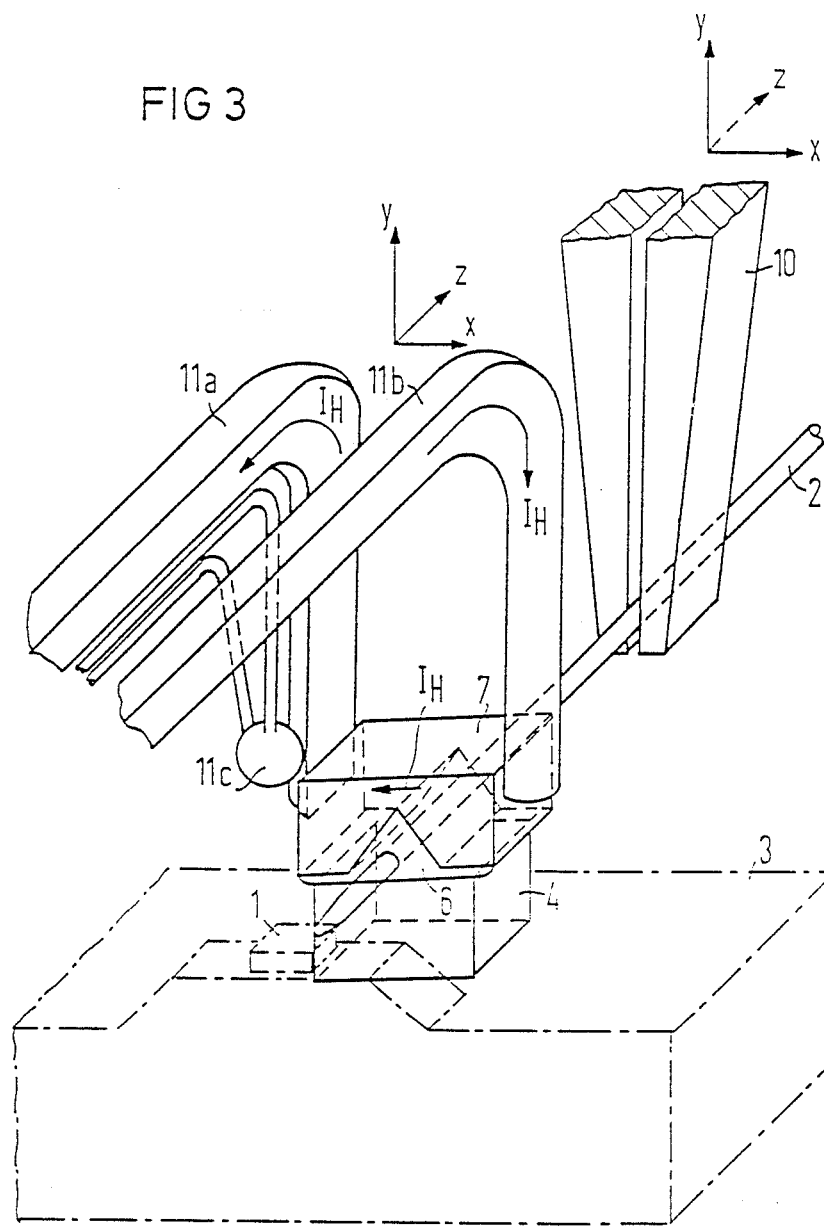

METHOD FOR POSITIONING AND BONDING A SOLID BODY TO A SUPPORT BASE

BACKGROUND OF THE INVENTION

This invention relates to an arrangement wherein a plurality of body members are positioned in precise relationship on a carrier body, and, more particularly, it relates to an arrangement wherein manipulators position these bodies at elevated temperatures and in an inert gas environment.

The technical problem is one of positioning and bonding a solid body in a specific spatial relation to another object. It is often necessary to position a solid body relative to another object with a high degree of accuracy and to attach it at the respective positioned location in a manner that will provide long term stability, upon achieving this accuracy.

A light beam wave-guide, for example a glass fibre or optical fibre, is to be affixed to a laser diode with a specified separation larger than or equal to zero or to some predetermined value. Through the use of proper optics a light beam wave-guide is to be attached to a laser diode with a specified separation greater than zero, whereby the light emitted by the diode is, for example, to be efficiently coupled by means of the proper optics to the beam wave-guide. A tapered lens arranged at the end of the glass fibre may, for example, be employed as the suitable optics.

During the attachment of a light beam wave-guide to a laser diode with a specified separation, especially during the application of a single mode optical fibre as a beam wave-guide, particularly stringent requirements are posed with regard to the positional accuracy and to the long term stability of this positional accuracy during operating and storage conditions. The positional accuracy of a single mode optical fibre must then have a long term stability with a maximum tolerance of within or $\pm 0.05$ $\mu$m. This maximum tolerance must not be exceeded during operation and storage conditions over the range of $-40°$ C. to $+60°$ C.

With regard to the respective light beam wave-guides employed, either smaller or greater accuracies must be maintained for positioning and bonding the light beam wave-guide in front of the respective laser diode.

In the case of multi-mode optical fibres, for example, in the case of graded index fibres with a cone diameter of 50 $\mu$m, a position and long term location tolerance $\Delta x$, $\Delta y$ on the order of $\pm 1$ $\mu$m must be maintained. In the application of a single mode optical fibre which may exhibit a core of 5 $\mu$m, for example, a position and long term location tolerance $\Delta x$, $\Delta y$ on the order $\pm 0.05$ $\mu$m must be maintained.

With presently available mechanical and electro-mechanical adjusting devices, for example, with a stepping motor, with a piezo-crystal etc., the attainment of the previously mentioned adjustment accuracies for short periods, and the retaining of this accuracy for seconds, and even minutes, is relatively free of problems.

It is however impossible, with presently available procedures and devices, to bond the beam wave-guides with the attained accuracy, while maintaining the respective location of the beam wave-guide, after positioning, in the long term.

Previously, a number of different light beam wave-guide bonding methods were, or would be, applied in the construction of laser diode modules. In most of the laser modules on the market today, the laser diode is attached to its own mount assembly which is in turn attached through an intermediate fastening element to a light beam wave-guide bonding point. In this way the light beam wave-guide is either fastened in a capillary made of metal-quartz or similar materials, or directly attached at the point of bonding. The attachment of the light beam wave-guide is thus accomplished through the following different techniques or arrangements.

In one technique, the beam wave-guide is directly cemented to the positioning point. In another technique, the beam wave-guide is cemented into a capillary and the capillary is in turn cemented, soldered, welded etc., at the positioning point. In a third technique, the beam wave-guide is metalized, then soldered into the capillary and the capillary then soldered to the positioning point, etc.

All of these conventional bonding techniques for a light beam wave-guide have to a greater or lesser extent disadvantages of various kinds, as for example:

(I) During cementing of the beam wave-guide to the positioning point, the beam wave-guide must be held in position at the positioning point to an accuracy of $\pm 0.05$ $\mu$m during hardening of the cement, which is practically impossible in the present state of the art.

(II) Too little is as yet known about the long term stability of the various cements.

(III) During the soldering of the beam wave-guide at the bonding point with the assembly techniques employed until now for beam wave-guide module construction, a heat source is necessary for heating the solder, which to a large extent also heats the laser diode, so that operation of the laser diode during the positioning procedure is not possible in most cases, whereby adjustment by coupling to light and optical observation during photo-diode operation is impossible and accurate positioning is made substantially more difficult.

(IV) During welding or soldering of a beam wave-guide mounted in a capillary, a considerable displacement of the beam wave-guide may occur, during the cooling process, especially in the case of welding, that is substantially greater than $\pm 0.05$ $\mu$m.

(V) In all of the light beam wave-guide techniques mentioned in the foregoing, the light beam wave-guide is attached to the mount assembly on which the laser diode is mounted, through intermediate elements, such as through various metals, various materials, screwed and/or soldered and/or cemented. The stability of the beam wave-guide is thereby directly related to the mechanical and thermal behavior characteristics of these intermediate elements, this means, that a displacement or a thermal stress, which must of necessity arise, during temperature cycling between $+60°$ C. and $-40°$ C. with many of the intermediate elements used in the present arrangements of the prior art, are directly carried over into the light beam wave-guide laser coupling and make it practically impossible to maintain long-term stability.

SUMMARY OF THE INVENTION

An object of the present invention is to provide a technique and an arrangement of the type previously referred to including a fabricated component in which a solid body may be positioned with high accuracy and bonded with good long-term stability at the desired location established during positioning.

The invention broadly includes an attachment method and a positioning and attachment procedure for solid bodies, particularly for light beam wave-guides, e.g. for glass fibres, which overcome the disadvantages of prior techniques and achieves substantial simplification over conventional techniques.

BRIEF DESCRIPTION OF THE DRAWING

Features of the invention and additional objects of the invention will be more readily appreciated and better understood by reference to the following detailed description which should be considered in conjunction with the drawing.

FIG. 3 demonstrates an arrangement and a device according to the invention.

DETAILED DESCRIPTION

Figure 1:
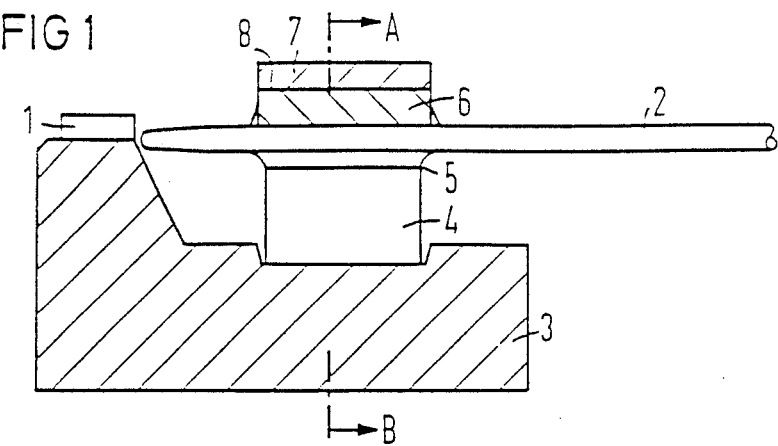
FIG. 1 is a cross section-view of an illustrative embodiment for a component.
Figure 2:
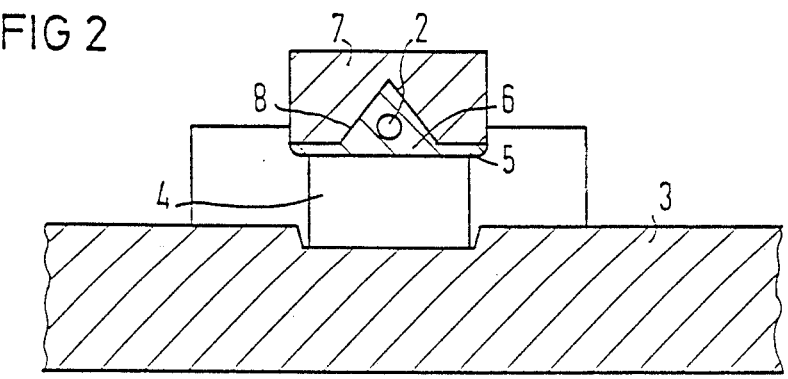
FIG. 2 is a cross sectional view of the illustrative embodiment of FIG. 1 along line A-B.

FIGS. 1 and 2 include an optical fibre attachment arrangement or mount 4, 5, 6, 7 and the diode laser chip 1 on a common base 3. By this arrangement the best possible attachment of the solid body 2 is obtained without resorting to intermediate parts or components.

For bonding, the light beam wave-guide 2 is imbedded in solder 6, e.g. in SnPbAg or another solder composition with a specified separation from the laser diode 1. The solder 6, is itself enclosed in a further body 7, shown in FIGS. 1 and 2 in the form of a V-grooved-chip, in order to achieve a best possible mechanical solder stabiltiy. The further body 7 comprises semiconductor material, for example silicon. The V-groove of the body member 7 may be etched and may be metalized. The soldered attachment to the base 3 which is common to the laser diode 1 and to the light beam wave-guide 2 is achieved thereby through a low heat conducting fibre support base, solderable at its upper and lower sides. The support base 4 may also be metalized with a layer 5 on its upper and corresponding lower sides. With the combined beam wave-guide attachment 4, 5, 6, 7 a positioning of the light beam wave-guide 2 is possible during laser operation at a laser temperature of 25° C.

Suitable materials having low heat conductivity that adapted for this purpose include metalized glasses, metalized ceramics (Porcelain), metallized quartz and also metals such as stainless steel or other metals. It is then possible, through the selection of suitable materials and through suitable geometry of the support base 4, to match the vertical thermal expansion ($\Delta y$) of the beam wave-guide support base 4 with the vertical thermal expansion of the laser diode base 3, in order to avoid beam wave-guide positional shifts, due to differential thermal expansion, in the range of $\pm 0.05$ $\mu$m. Traverse positional changes ($\Delta x$) due to thermal expansion, are fundamentally ruled out through the attachment of the laser diode 1 and the beam wave-guide 2 to a common base.

FIG. 1 illustrates a lengthwise sectional view through a component according to the invention along the axis of the beam wave-guide 2. The axis of the light beam wave-guide 2 is considered to be the z-axis. FIG. 2 illustrates a cross sectional view taken approximately through the middle (line A-B) of the light beam wave-guide attachment 4, 5, 6, 7 of the embodiment of FIG. 1.

FIG. 3 illustrates the light beam wave-guide positioning and bonding procedure. In principle the bonding, by soft soldering, of the light beam wave-guide with a specified spacing relative to the laser diode is demonstrated as shown in FIGS. 1 and 2 and indeed in the region of the beam wave-guide attachment 4, 5, 6, 7 through coating of the light beam wave-guide 2 in the x-direction and y-direction. The attachment of the light beam wave-guide in the z-direction may be accomplished through a capillary on the housing of the laser diode module, not shown in the Figure, or on base 4 itself, when the light beam wave-guide 2 is metallized in the area of the support base 4.

Positioning of the beam wave-guide occurs in the fluidized molten solder 6. The light beam wave-guide 2 is held in place upon cooling and solidification of the solder 6, at the end of the positioning procedure. The height of the support base 4 presents the only limitation on the positioning play but this may be fixed in advance through correspondingly tighter tolerances.

The upper body member 7 is employed as an attachment accessory, and simultaneously as a heat source for melting the solder 6, used in bonding the beam waveguide.

In this procedure it is not necessary to employ an external heat source to melt the solder i.e. a hot gas, an arc, a hot iron, etc., with which the laser diode is frequently heated as well. More often it is possible with this procedure to heat only that region of the light beam wave-guide 2, relative to the z-axis, in which the solder 6 is present. Thereby the power dissipation of the semiconductor 7 during current flow is used for heating (Schottky-Contact and bulk resistance), that is, the semiconductor body 7 is clamped between two electrodes 11a and 11b of a current regulated power supply. These electrodes are constructed in the form of a clamp or tongs and fastened to an x, y, z manipulator. A thermal sensor 11c attached to the one leg of the "heating clamp" for temperature control. This thermal sensor may be soldered, welded, cemented, etc. on.

The semiconductor body 7 may be a silicon chip or another type of semiconductor chip in this arrangement.

If a voltage is now applied to the clamp formed electrodes 11a, 11b, a heating current $Ih$, will flow through the semiconductor body 7, after a defined breakdown voltage (Schottky-contact between the metal of the electrodes 11a 11b and the semiconductor body 7) is reached, which will raise the temperature of the semiconductor body 7 to soldering temperature. With the use of a silicon chip as the semiconductor body 7, the breakdown voltage is about 80 V and the heating current required to heat to soldering temperature is approximately 10 to 20 mA. It is important herewith, that the current required for heating is controlled through a current regulated voltage source. The desired temperature of the semiconductor body 7 can then be directly regulated and controlled with the thermal sensor 11c.

The solder 6 necessary for the fastening or securing of the light beam wave-guide 2 can be applied through pre-tinning of the metallized semiconductor body 7 to the respective desired degree. The support base 4 is therewith also pre-tinned on its upper surface with the same solder.

In order to immerse the beam wave-guide 2 into the positioning solder 6, the solder preform 6, on the semiconductor body 7, is melted with the "heating clamp" consisting essentially of the electrodes 11a, 11b, as described above, and the semiconductor body 7, which is attached to the "heating clamps", is then lowered, while in the heated condition, with the manipulator, to which the "heating clamp" is attached, over the optical wave-guide fiber 2.

The melted solder 6 surrounded by the bare metallizing of the light beam wave-guide 2 envelops the beam wave-guide 2 and joins with the remaining solder on the upper surface of the support base 4, and with that around the light beam wave-guide 2, in the region of the bonding point, so that complete solder immersion of the beam wave-guide takes place. Meanwhile any oxidation of the solder can be prevented through the use of a protective inert gas, and a uniform distribution of the solder achieved by movement of the semiconductor body 7 in the combined x and y directions. It is then possible, while the solder is in the fluid condition, to optimally align the semiconductor body 7 with the V-groove, in the x, y, z direction on the beam wave-guide 2 by means of the heating clamp manipulator, of which the electrodes 11a and 11b are a part and/or the semiconductor body 7 may by positioning of the light beam wave-guide 2 may, by means of an additional light beam wave-guide manipulator 10, be re-positioned so the, for example, the most uniform and narrow gap between the light beam wave-guide 2, V-groove of the semiconductor body 7 and the support base 4 results, through which the long term stability may be favorably affected.

Upon achievement of the desired position of the light beam wave-guide 2 the positioning solder 6 is allowed to cool down and solidify through a continuous controlled reduction of the heating current, and the light beam wave-guide 2 is bonded at the positioned location. The solder melting and positioning process can thereafter be repeated at will.

Upon proper beam wave-guide bonding the heating clamp is opened without loading of the semiconductor body 7 and the light beam wave-guide component parts 4, 5, 6, 7 thus separated from the heating clamp manipulator. The same applies to the additional light beam wave-guide manipulator 10.

When UV-curable and/or that heat curable adhesives or cements are employed instead of solder, the semiconductor body 7, with the V-groove may be substituted for measuring the cement quantity; for the absolute quantity, and the uniform distribution of the bonding agent 6, that is symmetrical about a plane which is normal to the base of the light beam wave-guide 2 and which contains the axis of the light beam wave-guide 2, around the light beam wave-guide 2, is of great importance.

In general the described procedure can also be applied to other similar components. For example, an infrared-emitting diode (IRED) can be used as element 1. The procedure described can also be employed in other devices for positioning and bonding such as for the positioning and bonding of wires or other objects that must be positioned relative to another object with high accuracy and have great long-term stability.

An important feature of the invention, is the use of another body 7, as an aid for positioning and bonding the solid body 2, and which simultaneously serves as a heat source for the melting of the attaching solder 6. When, therefore, the other element 7, provides these functions without itself adhering to the bonding agent 6, that has solidified at the end of the procedure, the other body 7, together with the heating clamp, can be removed again upon the solidification of the bonding agent 6. Therefore, the further element may in fact be a part of the heating clamp. The further body 7 need not necessarily be a semiconductor element in order to have these characteristics. For example, a carbon glass, already known from its use in hot cathode devices may be employed which, because of the spatial anisotrophy of its electronic transport characteristics, can provide a high heating capacity along with additional favorable mechanical and physical properties. With suitable treatment of the surface of the groove of such a further body 7, and with an additional surface coating is required, which makes the separation of the body 7 possible, after the solidification of the bonding agent, the further body 7 may again be separated from the solidified bonding agent. The nature of such coatings, for example a hard, smooth thin layer which may be evaporated, sputtered or otherwise applied is well known to those skilled in the art.

Another important feature of the invention is, that in the application of a low thermally conducting support base 4, only region directly adjacent to the solid body 2, together with the bonding agent 6, need be brought to a higher temperature. If the support base 4 is itself a part of the base 3, this advantage can also be achieved by making the entire base 3 of a low thermal conductivity material.

The support base 4 and the laser diode 1 may also be arranged on various substrates. In each case the bonding agent employed may be either solder or a cement.

The heating of the bonding agent 6 need not necessarily result from current flow through the further body 7. The heating of the further body 7 can also be brought about through induction, with the aid of alternating electric field, aimed at said radiating in the direction of the further body 7. Therewith the requisite heating of the bonding agent 6 is generated in the interior of the further body 7. The heating of the bonding agent may also be brought about through heat radiation which is absorbed by the further body 7. A heat absorbing upper surface of the other body 7 is advantageous for this purpose. The heat radiation may be produced by a platinum heating resistance, and may additionally be reflected with suitable optics and aimed at the further body 7. The heating of the bonding agent 6 may also be produced through a heating device which is in direct thermal contact with the further body 7 and heats this further body 7 exclusively. For example, a device similar to the tip of a soldering iron may be applied to the further body 7. In each of these cases the further body 7 functions as a heating die that is not heated through the passage of current.

Figure 4:
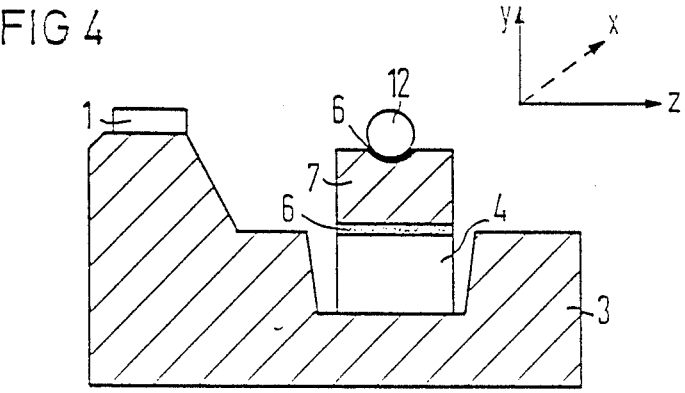
FIG. 4 depicts another illustrative embodiment in accordance with the invention.

FIG. 4 illustrates a longitudinal sectional view through an additional embodiment of the invention similar to the lengthwise section of FIG. 1. A further body 7 provided with a depression (cavity, groove) may also be employed as the further body, whereby this depression serves as a means of positioning and bonding of the solid element 2 and/or the solid element 12. FIG. 4 shows the depression of the further body 7 at the top and, as an example, is provided with a lens, in the case of FIG. 4, a spherical lens 12. Here the lens 12 may be firmly attached to the further body 7. The solid body 12 may, in this way, be indirectly bonded and positioned through the bonding and positioning of the further body 7 in FIG. 4.

As an example, the solid element 12 in the depression of the further body 7 may be bonded with a type of bonding agent 6 having a higher melting point than the layer of bonding agent 6 between the support base 4 and the further body 7 in FIG. 4. An arrangement is thus provided to allow the layer of bonding agent 6 between the support base 4 and the further body 7 to melt and flow, upon the heating of the further body 7, without, however, the bonding agent 6, between the solid element 12 and the supplemental element 7, having melted and flowed at this temperature.

The further body 7 of FIG. 4 may be heated in exactly the same way as described in FIGS. 1 through 3 above. The further body 7 may be positioned in both the directions x and z in space, shown in FIG. 4, which together define the mounting surface of the support base 4. The positioning in the different directions in space may be accomplished with the aid of a manipulator. Positioning in the y direction, that is positioning parallel to the normal of the mounting surface of the support base 4, can in practice follow, without the need for additional bonding agent 6, in that, upon lowering of the solid body 12, a part of the bonding agent 6, is forced out of the intermediate space between the support base 4 and the further body 7 and that, in the opposite case, upon lifting of the solid body 12, the bonding agent 6 will be pulled back into the intermediate space between the support base 4 and the further body 7.

The further body 7 serves as an assisting body for transferring the thermal energy to the bonding agent 6 in order to cause this to melt and flow.

The bonding agent 6 in the intermediate space between the support base 4 and the supplemental element 7 may have a thickness in the order of 0.1 to 0.2 mm. In the application of the spherical lens 12 as solid body, the diameter of this solid body may be 500 $\mu$m. If the solid body 12 is a spherical lens and if the center of the spherical lens lies on the optical axis of the emitted light bundle of the object 1, the divergent light bundle emitted can be formed into a parallel ray bundle by means of the spherical lens.

There has thus been shown and described a novel mounting arrangement for an optical fibre coupled to a laser diode which fulfills all the objects and advantages sought therefor. Many changes, modifications, variations and other uses and applications of the subject invention will, however, become apparent to those skilled in the art after considering this specification which disclose preferred embodiments thereof. All such changes, modifications, variations and other uses and applications which do not depart from the spirit and scope of the invention are deemed to be covered by the invention which is limited only by the claims which follow.

We claim:

1. A method for positioning and mounting a solid body in which a portion of the solid body together with a bonding agent is arranged on a further body and bonded to a support base the further body including a groove and adapted to supply heat energy, position the solid body, and contain the bonding agent; the method comprising:

at least partially immersing the solid body in the bonding agent contained by the further body;

supplying heat energy from the further body such that the solid body and the further body can be moved individually or in relation to each other while contacted by the bonding agent;

aligning the solid body with the further body with the aid of the groove of the further body;

positioning the solid body in a location relative to the support base; and cooling the bonding agent by controlling a reduction in the supply of heat energy from the further body such that the solid body is bonded to the support base.

2. The method according to claim 1, wherein the source of heat energy supplied by the further body is electrical current flow through the further body.

3. The method according to claim 1, wherein the source of heat energy supplied by the further body is induction.

4. The method according to claim 1, wherein the source of heat energy supplied by the further body is thermal contact.

5. The method according to claim 1, wherein the source of heat energy supplied by the further body is thermal irradiation.

6. The method according to claim 1, wherein the bonding agent is first located with the groove of the further body and the further body supplies heat energy until the bonding agent softens, and the solid body is immersed in the bonding agent.

7. The method according to claim 1, wherein the solid body is immersed in the bonding agent, the bonding agent being contained in the groove of the further body and the solid body is immersed in the bonding agent located within the groove in the further body.

8. The method according to claim 1, wherein the solid body includes a partial coating prior to application of the bonding agent for improving the bonding of the solid body in the bonding agent.

9. The method according to claim 2, wherein the solid body includes a partial coating prior to application of the bonding agent for improving the bonding of the solid body in the bonding agent.

10. The method according to claim 3, wherein the solid body includes a partial coating prior to application of the bonding agent for improving the bonding of the solid body in the bonding agent.

11. The method according to claim 4, wherein the solid body includes a partial coating prior to application of the bonding agent for improving the bonding of the solid body in the bonding agent.

12. The method according to claim 5, wherein the solid body includes a partial coating prior to application of the bonding agent for improving the bonding of the solid body in the bonding agent.

13. The method according to claim 6, wherein the solid body includes a partial coating prior to application of the bonding agent for improving the bonding of the solid body in the bonding agent.

14. The method according to claim 7, wherein the solid body includes a partial coating prior to application of the bonding agent for improving the bonding of the solid body in the bonding agent.

15. The method according to claim 1, wherein the bonding material comprises solder which is made to melt and flow, through heating the further body, for positioning and bonding.

16. The method according to claim 1, wherein the further body is clamped between two electrodes associated with a current source.

17. The method according to claim 1, wherein a semiconductor body serves as the further body.

18. The method according to claim 1, wherein a carbon body serves as the further body.

19. The method according to claim 1, wherein the desired temperature of the further body is regulated through a current utilized to heat the further body.

20. The method according to claim 1, wherein the location of the solid body and, if needed, that of the further body is controlled with at least one manipulator.

21. The method according to claim 1, wherein oxidation of the bonding agent is prevented through the use of a protective inert gas.

22. The method according to claim 1, wherein the further body with its groove, is employed for apportioning the quantity of bonding agent.

23. The method according to claim 1, wherein the bonding material is spread symmetrically with reference to a plane containing a longitudinal axis of the solid body and that is normal to the base of the solid body.

24. The method according to claim 1, wherein the solid body together with further body is bonded to the support base.

* * * * *